March 4, 1941.  C. D. MAGNESEN  2,233,624
BEARING SEAL
Filed Dec. 12, 1938    2 Sheets-Sheet 1
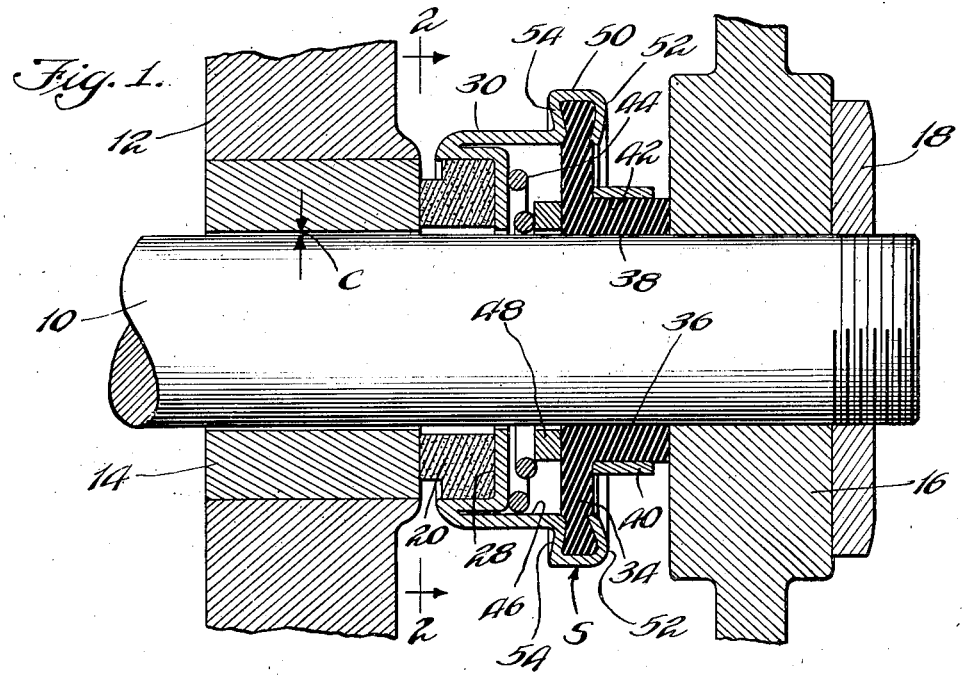
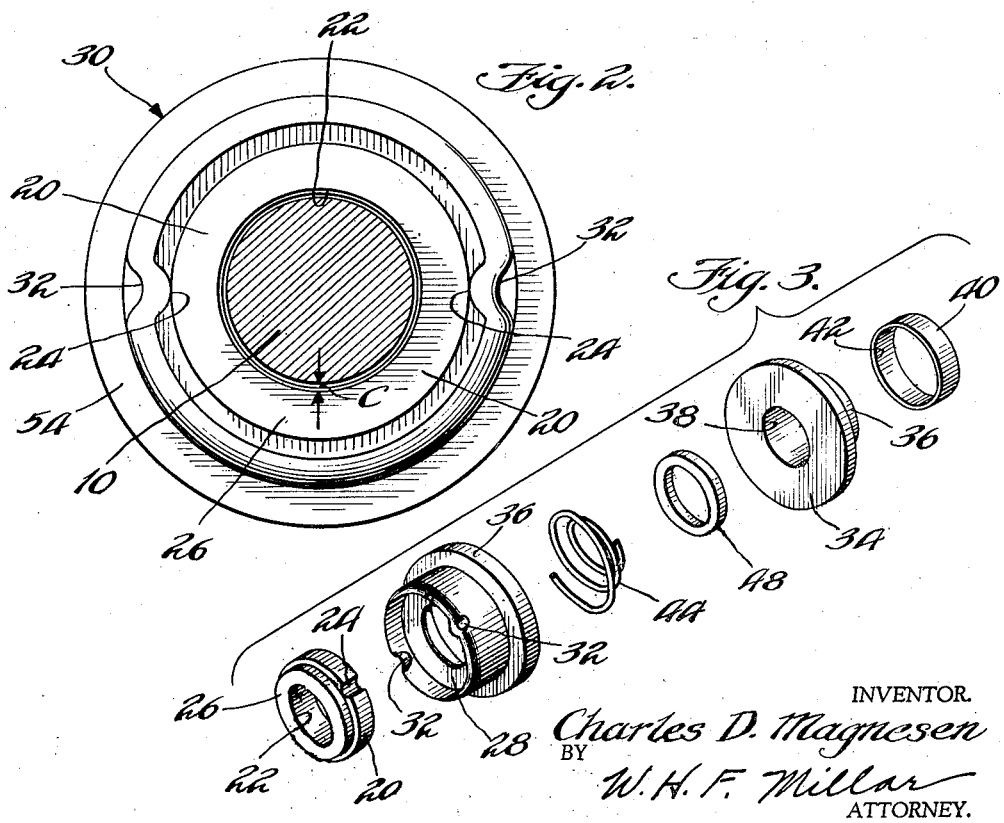
INVENTOR.
Charles D. Magnesen
BY W. H. F. Millar
ATTORNEY.

March 4, 1941.  C. D. MAGNESEN  2,233,624
BEARING SEAL
Filed Dec. 12, 1938  2 Sheets-Sheet 2
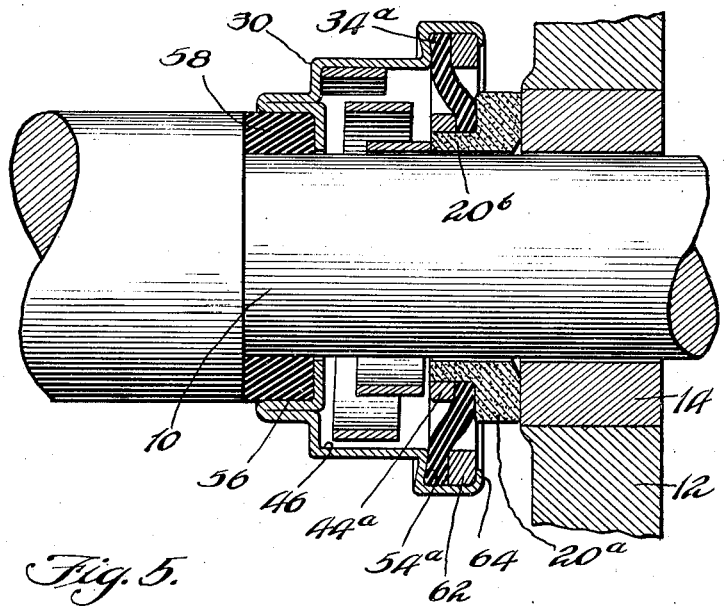
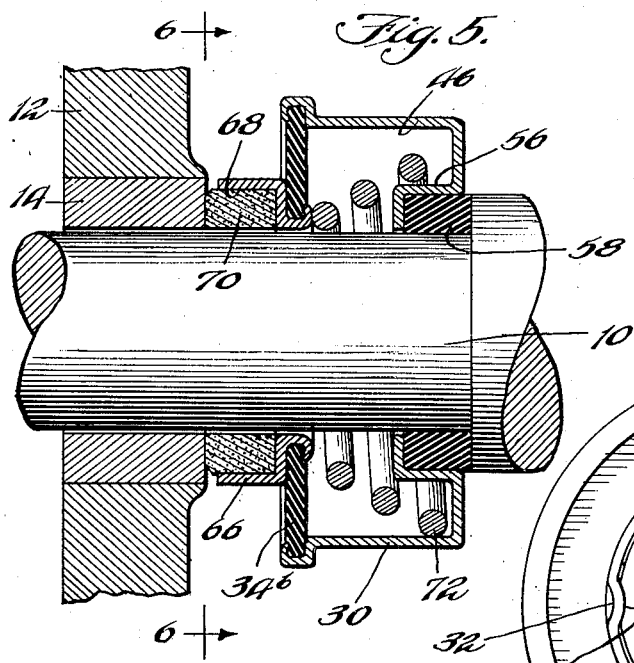
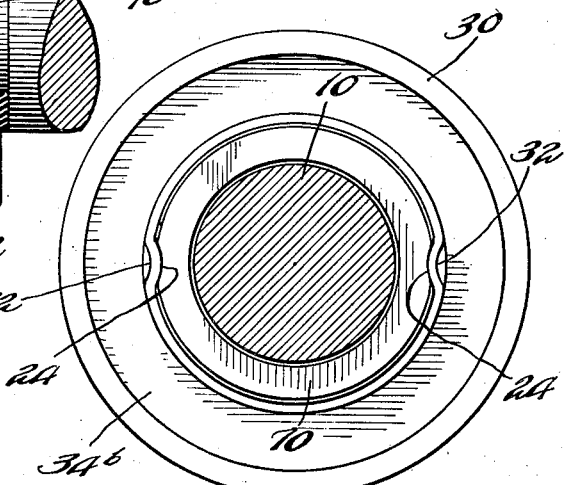
INVENTOR.
Charles D. Magnesen
BY W. H. F. Millar
ATTORNEY.

Patented Mar. 4, 1941

2,233,624

UNITED STATES PATENT OFFICE 2,233,624

BEARING SEAL

Charles D. Magnesen, Chicago, Ill., assignor to Magneseal Company, a corporation of Illinois Application December 12, 1938, Serial No. 245,143

3 Claims. (Cl. 286—11)

My invention relates to bearing seals and similar devices.

My invention relates more particularly to sealing devices or sealing means adapted to form a fluid seal between two relatively rotated parts.

The principal object of the present invention is to provide a new and improved bearing seal for preventing the leakage of fluid past bearing surfaces or relatively rotary parts.

A further object of the present invention is to provide such a seal that is very efficient in operation and capable of being constructed with a minimum of parts.

Heretofore great difficulty has been encountered in preventing liquid or fluid contained in a housing that supports a rotating shaft from escaping from the housing along the shaft. This difficulty is encountered particularly in automotive constructions such as automotive water pumps in which the housing contains lubricant for minimizing friction between the moving parts and the bearings therefor. The same difficulty arises in pump and fluid motor constructions of various types, in compressors for refrigerators, in pumps and other mechanisms for use in handling milk or other materials, and in a great many other industries than those mentioned. While various constructions have been proposed to obviate the difficulty just referred to, such constructions have not generally been entirely satisfactory. One type of sealing device at present on the market contemplates the provision of bellows to hold the sealing device against the bearing surface. These devices have been unsatisfactory for the reason that because of the action of the shaft in the housing and its variation from a single plane, the sealing member is moved about with the shaft, causing the bellows to crack after a very short life. Another objection to various types of sealing devices at present on the market lies in the fact that they are comparatively large and composed of a great number of parts. This naturally diminishes their desirability for use in locations where the space is small and also in places where repair or replacement requires the dismantling of a considerable part of a machine.

Other objects of the present invention are to provide a bearing seal that is so constructed that regardless of the hard and rough usage which it receives, it will not easily wear out or become broken.

A further object of the present invention is to provide a bearing seal so constructed that it can be made up in a large number of stock sizes to fit any of the standard size shafts so that it may be easily secured and easily placed in use.

A further object of the invention is to provide a bearing seal so constructed that it can be easily removed for cleaning or repair or replacement, one in which the sealing nose, which is the only part that wears out during normal use, can be easily removed and replaced without disassembling the entire sealing device.

A further object of the present invention is to provide a bearing seal so constructed that fluid under pressure, which may escape from a compressor or other housing into the sealing device, will assist in maintaining a seal to prevent the escape of the fluid along the shaft.

Other objects and advantages will be more apparent from the following description wherein reference is had to the accompanying two sheets of drawings upon which Fig. 1 is a vertical sectional view on an enlarged scale through my improved bearing seal shown in position between a fly wheel on a shaft and a compressor or other housing;

Fig. 2 is a vertical sectional view taken along the lines 2—2 of Fig. 1, showing the front of the bearing nose;

Fig. 3 is an exploded perspective view of my improved bearing seal illustrating the six parts which are assembled together in front perspective form;

Fig. 4 is a vertical cross sectional view similar to Fig. 1 of a modified form of construction;

Fig. 5 is a similar cross sectional view of a still further modified form of construction; and Fig. 6 is a vertical sectional view taken on the lines 6—6 of Fig. 5.

In the embodiment of the invention which I have chosen to illustrate I have shown a rotatable shaft 10 which may be a part of a compressor or other mechanism that is provided with a housing 12 and a bearing member 14. The shaft 10 may extend to the outside of the housing 12 of the compressor, thereby provided with a fly wheel 16 suitably keyed to the shaft and held in position by a retainer nut 18. As thus constructed it will be understood that there is sufficient clearance, designated on the drawings by the letter C between the opening through the bearing 14 and the shaft 10, so that fluid under pressure can escape through the opening which I have described. In order to prevent the escape of this fluid under pressure, I have provided the bearing seal assembly S positioned on the shaft between the fly wheel 16 and the compressor housing 12.

Referring to Fig. 3, the bearing assembly may include the bearing nose 20, which is preferably formed of carbon, bronze or hardened steel, depending entirely upon the type of fluid which it is desired to confine. The nose 20 is formed with an axial bore 22 slightly larger than the diameter of the shaft 10. It is also provided with a pair of recesses 24 and a reduced forward portion 26. The nose 20 is adapted to be positioned in a recessed opening 28 formed in the forward end of a cylindrical shell member 30. The wall of the recess 28 is formed with a pair of indentations 32 of a size and shape complementary to the grooves 24 in the nose 20. By this construction, when one of the members is placed in the recess, it will be rotated with the shell 30. In order to secure a driving medium for the bearing seal S, I have provided a diaphragm 34, preferably constructed of neoprene or other synthetic rubber product which is capable of withstanding heat, water, and other conditions encountered in various machines. The diaphragm is preferably formed with a collar portion 36, having a bore 38 of a slightly smaller diameter than the shaft 10, so that when the same is frictionally mounted on the shaft, it will rotate therewith. In order to effectively secure this frictional engagement, I provide a ring member 40 having an opening 42 of a diameter slightly smaller than the diameter of the sleeve 36, so that when the diaphragm is mounted on the shaft and the ring 40 placed in position, there is a fixed attachment to the shaft. By reason of the flexibility of the diaphragm 34 and to securely hold the bearing nose 20 in engagement with the end of bearing 14 at all times, I provide a helically wound compression spring 44 positioned in the chamber 46 in the housing 30. I also provide a washer 48 loosely fitted about the shaft 10 and providing a bearing against the diaphragm 34. The diaphragm 34 may be fixedly held about its edge in a recess 50 formed in the housing 30 and may be held in a sealing condition by crimping over the edge 52 of the sheet metal housing against a shoulder 54 against which the diaphragm is positioned. In this manner the assembly is completed and capable of being installed upon a rotatable shaft. By reason of the fact that fluid under pressure will enter the housing 30 through the space C it can readily be seen that the sealing action, both of the nose 20 against the bearing 14 and the frictional engagement of the sleeve 36 on the shaft 10, are increased by fluid pressure which enters the chamber 46 of the housing 30. Due to the flexibility of the diaphragm 34, this pressure will transmit force in two directions; that is, against the sleeve 36 of the diaphragm and in the opposite direction against the bearing nose 20.

In Fig. 4 I have illustrated a modified form of the invention in which I have provided a recess 56 in the end of the seal 30 for the purpose of holding a friction washer 58 in frictional engagement with the shaft 10. The seal nose 20a is adapted to be held against the edge of the bearing 14 by a helically coiled spring member 44a that bears against the inner edge of the same. The sealing nose may be formed with a reduced shoulder 20b and be connected to a flexible diaphragm 34a by a ring member 60, frictionally mounted over the reduced portion 20b of the bearing nose. The outer edge of the diaphragm may be held against a shoulder 54a in the housing 30 by a ring member 62 which is held in position by a turned over ridge 64. With this construction it can be seen that the bearing nose, which must at all times be in frictional engagement with the stationary bearing 14, is flexibly mounted so that movement of the shaft back and forth or in any other direction will readily permit a corresponding movement by the seal nose, thus at all times preventing the escape of fluid at the bearing point. It will further be noted that with this construction the fluid pressure may assist, and does assist, in keeping the seal nose against the stationary bearing, as pressure which enters the chamber 46 will tend to hold the friction washer 58 more securely in place and at the same time hold the bearing nose 20a against the stationary bearing.

In Figs. 5 and 6 I have shown a still further modified form of the invention, in which I provide the friction washer 58 positioned in an annular recess 56 in the housing 30. The housing 30 in this instance is comparatively cylindrical in shape and has secured in its upper end the sleeve diaphragm 34b. The diaphragm 34b carries axially thereof a thimble member 66 which is formed with an open ended chamber 68 to carry a bearing nose 70. A coiled spring member 72 mounted in the chamber 46 of the housing 30 normally tends to hold the bearing nose 70 in contact with the stationary bearing 14 of the compressor housing. With the above described construction it can be seen that similar to the other constructions described, fluid under pressure which may escape along the rotating shaft 10 may enter the chamber 46 of the housing 30 and will assist the spring 72 in pressing the bearing nose 70 against the stationary bearing, as well as pressing the friction washer 58 into even more close engagement with the shaft 10.

From the above and foregoing description, it can be seen that I have provided a bearing seal constructed of a minimum of parts and comparatively simple as contrasted with the device of the prior art, a device which utilizes the fluid pressure which may escape about a revolving shaft for the very purpose of preventing the escape of the fluid to the atmosphere.

While I have illustrated and described a specific embodiment and several modifications of my invention, it will be understood by those skilled in the art that I do not desire to limit myself to the exact details shown, and rather what I desire to secure and protect by Letters Patent of the United States is:

1. In a sealing assembly for preventing a flow of fluid along the surface of a cylindrical shaft, a cyclindrically shaped housing adapted to loosely encircle said shaft, said housing formed of sheet metal bent back upon itself at one end to form a cup-shaped recess, a ring shaped bearing nose removably secured in said recess and held for rotation therewith and adapted to rest against an annular bearing surface, the other end of said housing secured to a resilient disc-like member having a sleeve portion adapted to be mounted for rotation with a cylindrical shaft, and a coiled spring member interposed between a wall of said housing and said disc-like member for yieldingly pushing said bearing nose outwardly to engage said bearing surface.

2. In a sealing assembly for preventing a flow of fluid along the surface of a cylindrical shaft, a cylindrically shaped housing adapted to loosely encircle said shaft, said housing formed of sheet metal bent back upon itself at one end to form a cup-shaped recess, a ring shaped bearing nose removably mounted in said recess and adapted to rest against an annular bearing surface, co-operating means between said nose and a wall of said recess for causing the same to rotate in unison, the other end of said housing secured to a resilient disc-like member having a sleeve portion adapted to be mounted for rotation with a cylindrical shaft, and a coiled spring member interposed between a wall of said housing and said disk-like member for yieldingly pushing said bearing nose outwardly to engage said bearing surface.

3. In a sealing assembly for preventing a flow of fluid along the surface of a cylindrical shaft, a cylindrically shaped housing adapted to loosely encircle said shaft, said housing formed of sheet metal bent back upon itself at one end to form a cup-shaped recess, a ring shaped bearing nose removably mounted in said recess and adapted to rest against an annular bearing surface, co-operating means between said nose and a wall of said recess for causing the same to rotate in unison, said means including inwardly struck humps in the wall of said recess and complementary grooves in the outer surface of said bearing nose, the other end of said housing secured to a resilient disc-like member having a sleeve portion adapted to be mounted for rotation with a cylindrical shaft, and a coiled spring member interposed between a wall of said housing and said disc-like member for yieldingly pushing said bearing nose outwardly to engage said bearing surface.

CHARLES D. MAGNESEN.